United States Patent
Feng et al.

(10) Patent No.: US 11,003,952 B2
(45) Date of Patent: May 11, 2021

(54) METHOD AND APPARATUS FOR AUTOMATICALLY RECOGNIZING ELECTRICAL IMAGING WELL LOGGING FACIES

(71) Applicant: PetroChina Company Limited, Beijing (CN)

(72) Inventors: Zhou Feng, Beijing (CN); Hongliang Wu, Beijing (CN); Ning Li, Beijing (CN); Kewen Wang, Beijing (CN); Peng Liu, Beijing (CN); Yusheng Li, Beijing (CN); Huafeng Wang, Beijing (CN); Binsen Xu, Beijing (CN)

(73) Assignee: PetroChina Company Limited, Beijing (CN)

( * ) Notice: Subject to any disclaimer, the term of this patent is extended or adjusted under 35 U.S.C. 154(b) by 20 days.

(21) Appl. No.: 16/506,891

(22) Filed: Jul. 9, 2019

(65) Prior Publication Data
US 2020/0065620 A1   Feb. 27, 2020

(30) Foreign Application Priority Data

Aug. 24, 2018   (CN) .......................... 201810971743.1

(51) Int. Cl.
G06K 9/00 (2006.01)
G06K 9/62 (2006.01)
(Continued)

(52) U.S. Cl.
CPC .............. *G06K 9/6256* (2013.01); *G01V 3/20* (2013.01); *G01V 3/38* (2013.01); *G06K 9/0063* (2013.01);
(Continued)

(58) Field of Classification Search
None
See application file for complete search history.

(56) References Cited

U.S. PATENT DOCUMENTS

6,011,557 A    1/2000 Keskes et al.
10,725,189 B2 * 7/2020 Osypov .................. G01V 1/003
(Continued)

FOREIGN PATENT DOCUMENTS

CN   101899971 A   12/2010
CN   104732562 A   6/2015
(Continued)

OTHER PUBLICATIONS

Chinese Search Report dated Aug. 20, 2018 for CN Application No. 201810971743.1.
(Continued)

*Primary Examiner* — Soo Jin Park
(74) *Attorney, Agent, or Firm* — Young Basile Hanlon & MacFarlane, P.C.

(57) ABSTRACT

A method and an apparatus for automatically recognizing an electrical imaging well logging facies, wherein the method comprises: acquiring historical data of electrical imaging well logging; pre-processing the historical data of the electrical imaging well logging to generate an electrical imaging well logging image covering a full hole; recognizing a typical imaging well logging facies in the electrical imaging well logging image covering the full hole, and determining the electrical imaging well logging image covering the full hole as a training sample in accordance with a category of the imaging well logging facies; constructing a deep learning model including an input layer, a plurality of hidden layers, and an output layer; training the deep learning model using the training sample to obtain a trained deep learning model; and recognizing the well logging facies of the electrical imaging well logging image of the well section to be recognized using the trained deep learning model.

9 Claims, 4 Drawing Sheets

(51) Int. Cl.
　　　*G06N 3/08*　　(2006.01)
　　　*G06N 3/04*　　(2006.01)
　　　*G01V 3/20*　　(2006.01)
　　　*G01V 3/38*　　(2006.01)
　　　*G06K 9/36*　　(2006.01)
(52) U.S. Cl.
　　　CPC ........... *G06K 9/36* (2013.01); *G06N 3/04* (2013.01); *G06N 3/08* (2013.01)

(56) References Cited

U.S. PATENT DOCUMENTS

| 2014/0149041 | A1 |  | 5/2014 | Sung et al. |
| 2018/0274364 | A1 | * | 9/2018 | Li ........................ G01V 8/02 |
| 2019/0034812 | A1 | * | 1/2019 | Borrel .................... G06N 5/04 |
| 2019/0147125 | A1 | * | 5/2019 | Yu ......................... E21B 21/08 703/10 |

FOREIGN PATENT DOCUMENTS

| CN | 105626058 | A | * | 6/2016 | ............ G01V 1/40 |
| CN | 106443802 | A |  | 2/2017 | |
| CN | 106526693 | A |  | 3/2017 | |
| CN | 106610508 | A |  | 5/2017 | |
| CN | 107356958 | A |  | 11/2017 | |
| CN | 107797154 | A |  | 3/2018 | |
| EP | 0561492 | A2 |  | 9/1993 | |
| WO | 2003/052669 | A1 |  | 6/2003 | |

OTHER PUBLICATIONS

Wu Zhengyang et al., Convolutional neural network algorithm for classification evaluation of fractured reservoirs, Geophysical Prospecting for Petroleum, vol. 57, No. 4, pp. 618-626, Jul. 31, 2018.
Zou Changchun et al., Geophysical Well Logging, Geological Publishing House, pp. 130-134, Dec. 31, 2010.
Chinese Office Action and Search Report for Application No. 201810971743.1 dated Oct. 9, 2019.
Examination Report for UK patent application No. 1905799.1 dated Oct. 25, 2019.
Imamverdiyev et al., "Lithological facies classification using deep convolutional neural network," Journal of Petroleum Science and Engineering, 2019, pp. 216-228, vol. 174.

* cited by examiner

METHOD AND APPARATUS FOR AUTOMATICALLY RECOGNIZING ELECTRICAL IMAGING WELL LOGGING FACIES

TECHNICAL FIELD

The invention relates to the technical field of data processing and interpretation of electrical imaging well logging, and in particular to a method and an apparatus for automatically recognizing an electrical imaging well logging facies.

BACKGROUND

An electrical imaging well logging facies refer to features such as color, structure and the like of different types of sedimentary formations that are presented on electrical imaging well logging images. By analyzing the electrical imaging well logging facies and establishing relationship with lithofacies and sedimentary facies of the formation, it is possible to provide an important basis for comprehensive evaluation of reservoir well logging and for prediction of distribution of high-quality reservoirs. The traditional interpretation of the electrical imaging well logging facies is mainly that images are divided directly by experts according to their experience. Such interpretation is highly subjective and is difficult to meet urgent needs of oilfield production. The key to improve interpretation efficiency of electrical imaging well logging data is how to automatically recognize the electrical imaging well logging facies to realize automatic and intelligent processing.

There are two main existing methods for automatically recognizing an electrical imaging well logging facies, one of which is to recognize and quantitatively extract various geological features in the images on the basis of imaging well logging image segmentation, then to perform classification recognition by means of fuzzy mathematics, neural network, and etc. according to relationship between different geological feature phenomenon and the well logging facies. This method is controlled by image segmentation quality and a recognition effect of geological features and has a low recognition accuracy; the other one of which is to select typical imaging well logging images of different well logging phases as templates and to count feature parameter curves of typical images of various well logging phases, to determine the templates with high similarity by correlation matching and other similar methods for the images of a well section to be recognized, as a corresponding well logging facies category. This method is influenced by the selected feature parameter indexes, has a narrow application range and a low recognition accuracy, and cannot meet the needs of geological research and reservoir evaluation.

SUMMARY

Embodiments of the invention provides a method and an apparatus for automatically recognizing an electrical imaging well logging facies, which learns and predicts an electrical imaging well logging image by a deep learning method, can automatically recognize an electrical imaging well logging facies, achieves good processing efficiency and recognition accuracy, to thereby better studies and predicts reservoir distribution rule.

The method for automatically recognizing an electrical imaging well logging facies comprises:
acquiring historical data of electrical imaging well logging;
pre-processing the historical data of the electrical imaging well logging to generate an electrical imaging well logging image covering a full hole;
recognizing a typical imaging well logging facies in the electrical imaging well logging image covering the full hole, and determining the electrical imaging well logging image covering the full hole as a training sample in accordance with a category of the imaging well logging facies;
constructing a deep learning model including an input layer, a plurality of hidden layers, and an output layer;
training the deep learning model using the training sample to obtain a trained deep learning model; and
recognizing the well logging facies of the electrical imaging well logging image of the well section to be recognized using the trained deep learning model.

Embodiments of the invention also provide a computer device comprising a memory, a processor and a computer program stored on the memory and executable on the processor, when executing the computer program, the processor implementing the following method of:
acquiring historical data of electrical imaging well logging;
pre-processing the historical data of the electrical imaging well logging to generate an electrical imaging well logging image covering a full hole;
recognizing a typical imaging well logging facies in the electrical imaging well logging image covering the full hole, and determining the electrical imaging well logging image covering the full hole as a training sample in accordance with a category of the imaging well logging facies;
constructing a deep learning model including an input layer, a plurality of hidden layers, and an output layer;
training the deep learning model using the training sample to obtain a trained deep learning model; and
recognizing the well logging facies of the electrical imaging well logging image of the well section to be recognized using the trained deep learning model.

Embodiments of the invention also provide a computer-readable storage medium, on which a computer program executing the following method is stored:
acquiring historical data of electrical imaging well logging;
pre-processing the historical data of the electrical imaging well logging to generate an electrical imaging well logging image covering a full hole;
recognizing a typical imaging well logging facies in the electrical imaging well logging image covering the full hole, and determining the electrical imaging well logging image covering the full hole as a training sample in accordance with a category of the imaging well logging facies;
constructing a deep learning model including an input layer, a plurality of hidden layers, and an output layer;
training the deep learning model using the training sample to obtain a trained deep learning model; and
recognizing the well logging facies of the electrical imaging well logging image of the well section to be recognized using the trained deep learning model.

In embodiments of the invention, an electrical imaging well logging image is learned and predicted by a deep learning method, which can automatically recognize an electrical imaging well logging facies, achieves good processing efficiency and recognition accuracy, to thereby better studies and predicts reservoir distribution rule.

BRIEF DESCRIPTION OF THE DRAWINGS

In order to more clearly explain embodiments of the invention or the technical solution in the prior art, drawings that need to be used in the description in embodiments or the prior art will be simply introduced below, obviously the drawings in the following description are merely some examples of the invention, for persons ordinarily skilled in the art, it is also possible to obtain other drawings according to these drawings without making creative efforts.

DETAINED DESCRIPTION OF EMBODIMENTS

Hereinafter the technical solution in embodiments of the present invention will be described clearly and integrally in combination with the accompanying drawings in embodiments of the present invention, and obviously the described embodiments are merely part of embodiments, not all of embodiments. Based on embodiments of the present invention, all other embodiments that are obtained by persons skilled in the art without making creative efforts fall within the protection scope of the present invention.

Figure 1:
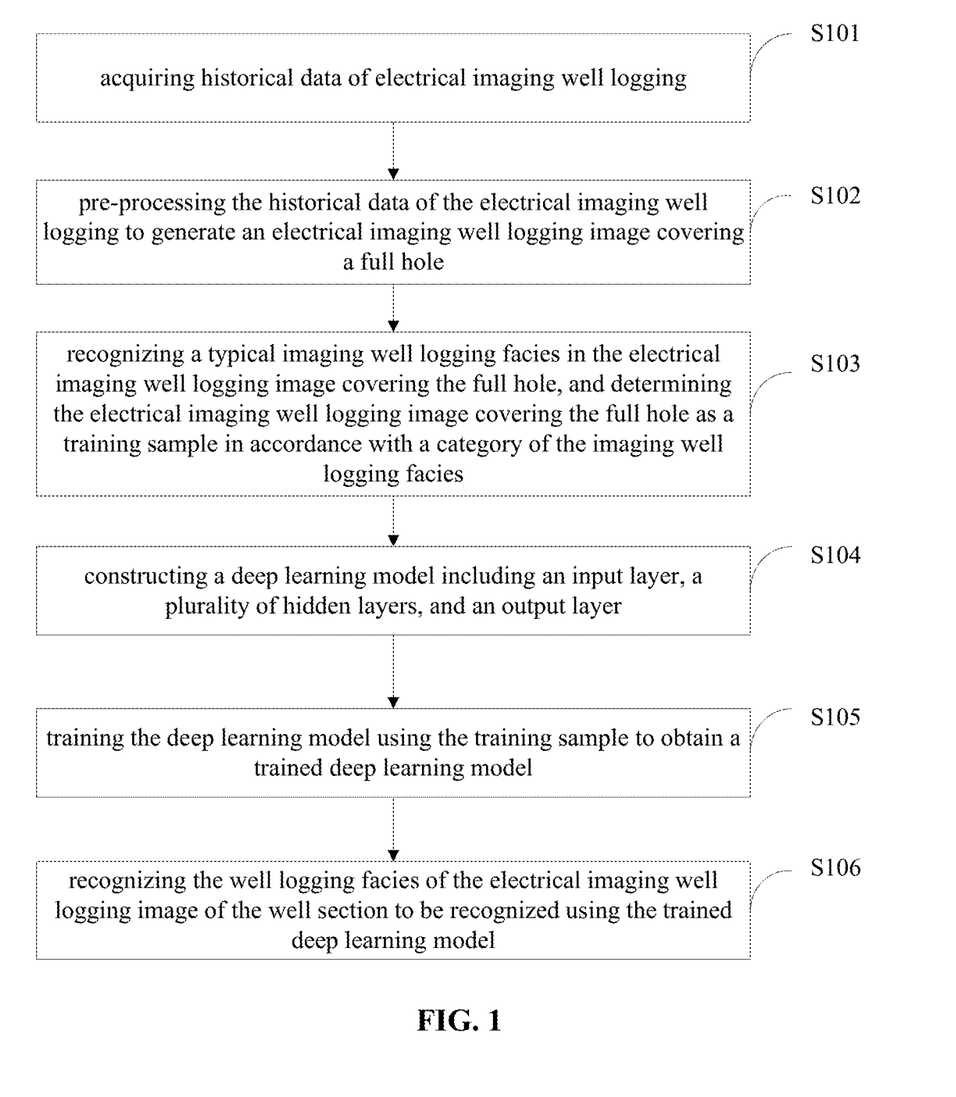
FIG. 1 is a flow chart of a method for automatically recognizing an electrical imaging well logging facies provided by embodiments of the invention.

In embodiments of the invention, there is provided a method for automatically recognizing an electrical imaging well logging facies, as shown in FIG. 1, the method comprising:

S101: acquiring historical data of electrical imaging well logging;

S102: pre-processing the historical data of the electrical imaging well logging to generate an electrical imaging well logging image covering a full hole;

S103: recognizing a typical imaging well logging facies in the electrical imaging well logging image covering the full hole, and determining the electrical imaging well logging image covering the full hole as a training sample in accordance with a category of the imaging well logging facies;

S104: constructing a deep learning model including an input layer, a plurality of hidden layers, and an output layer;

S105: training the deep learning model using the training sample to obtain a trained deep learning model; and S106: recognizing the well logging facies of the electrical imaging well logging image of the well section to be recognized using the trained deep learning model.

In embodiments of the invention, the step S101 includes collecting and sorting electrical imaging well logging data of a research area, and which may also include related data such as other conventional well logging data, geological data and core description and the like, so as to make a comprehensive understanding of the imaging well logging image display features of typical geological phenomena.

In embodiments of the invention, in the step S102, an original electrical imaging well logging image can be obtained after acceleration correction, equalization and other pre-processing are performed on the collected and sorted electrical imaging well logging data by an electrical imaging well logging processing system on a CIFLog well logging software platform, and resistivity scale processing is performed on the original electrical imaging well logging image to obtain a scale image reflecting resistivity of rocks of borehole wall formation.

At present, the electrical imaging well logging is measured by means of pole plate sticking to borehole wall and can not completely cover the full hole (usually the coverage can only reach 60% to 80%). Then a full hole image of the scale image reflecting resistivity of rocks of borehole wall formation is generated, and specifically, a full hole image processing method is adopted to perform probabilistic interpolation processing on the uncovered portion of the scale image, to obtain an electrical imaging well logging image covering the full hole. The full hole image processing can effectively make up a blank part in the original image, and the image features are more complete and intuitive, which lays the foundation for the automatic recognition and extraction of later image features, and improves the automatic recognition effect of the imaging well logging facies.

In embodiments of the present invention, in the step S103, the imaging well logging facies category of the electrical imaging well logging image covering the full hole is determined according to the needs of the study. Specifically, a well logging expert recognizes an imaging well logging facies of a typical well section in the full hole imaging well logging image that is obtained in the step S102, and stores the imaging well logging facies in accordance with the category of the well logging facies as a training sample image of deep learning. The sample image contains two attributes, on the one hand, the electrical imaging well logging full hole image of a corresponding depth section (generally 0.25 m) is recorded, and on the other hand, the imaging well logging facies to which the sample image belongs is its category label.

For each category of imaging well logging facies, as many samples as possible (not less than 100 samples) shall be selected, and the sample image shall cover possible color and structural pattern of the imaging well logging facies in the research region as much as possible.

Specifically, taking the study of sedimentary facies of Ordovician carbonate reservoirs in Tarim Oilfield as an example, the most concerned electrical imaging well logging facies include three basic well logging facies that are block-shape facies, layer-shape facies and patchy facies, and are subdivided into fifteen well logging subfacies, specifically as follows:

the block-shape facies includes dark low-resistivity block-shape facies and light high-resistivity block-shape facies, in which image color of the dark low-resistivity block-shape facies is black-brown color system, the image color is uniform and has no obvious structural feature; image color of the light high-resistivity block-shape facies is yellow-white color system, the image color is uniform and has no obvious structural feature.

The layer-shape facies includes dark low-resistivity thick layer facies, light high-resistivity thick layer facies, dark low-resistivity thin layer facies, light high-resistivity thin layer facies, dark low-resistivity staggered layer-shape facies, light high-resistivity staggered layer-shape facies, forward grading layer-shape facies, reverse grading layer-shape facies, dark low-resistivity deformation layer-shape facies, light high-resistivity deformation layer-shape facies, and interbedding facies, wherein image color of the dark low-resistivity thick layer facies is black brown color system, image color of the light high-resistivity thick layer facies is yellow-white color system, the dark low-resistivity thick layer facies and the light high-resistivity thin layer facies have such image structure that inner laminae are parallel to each other, and the occurrence is consistent with the top-bottom interface of the formation, and thickness of the single layer is more than 0.1 meter; image color of the dark low-resistivity thin layer facies is black-brown color system, image color of the light high-resistivity thin layer facies is yellow-white color system, the dark low-resistivity thin layer facies and the light high-resistivity thin layer facies have such image structure that inner laminae are parallel to each other, and the occurrence is consistent with the top-bottom interface of the formation, and thickness of the single layer is more than 0.1 meter; image color of the dark low-resistivity staggered layer-shape facies is black-brown color system, image color of the light high-resistivity staggered layer-shape facies is yellow-white color system, the dark low-resistivity staggered layer-shape facies and the light high-resistivity staggered layer-shape facies have such structure that laminae appear in groups, and single-layer occurrence is incongruity between groups; the forward grading layer-shape facies has such image color that the color darkens upwards and has such image structure that single-layer thickness decreases upwards; the reverse grading layer-shape facies has such image color that color becomes lighter upwards and has such image structure that single-layer thickness increases upwards; image color of the dark low-resistivity deformation layer-shape facies is black-brown color system, image color of the light high-resistivity deformation layer-shape facies is yellow-white color system, and the dark low-resistivity deformation layer-shape facies and the light high-resistivity deformation layer-shape facies have such image structure that laminae are twisted and deformed; the interbedding facies has such image color that dark color and light color interlace and has such image structure that thick lamina and thin lamina alternate.

The patchy facies include bright patch facies and dark patch facies, wherein the bright patch facies are ununiform in color, shows a patch shape, the patch color is lighter, and the background matrix color is relatively dark; the dark patch facies are ununiform in color, shows a patch shape, the patch color is darker, and the background matrix color is relatively lighter.

Figure 2:
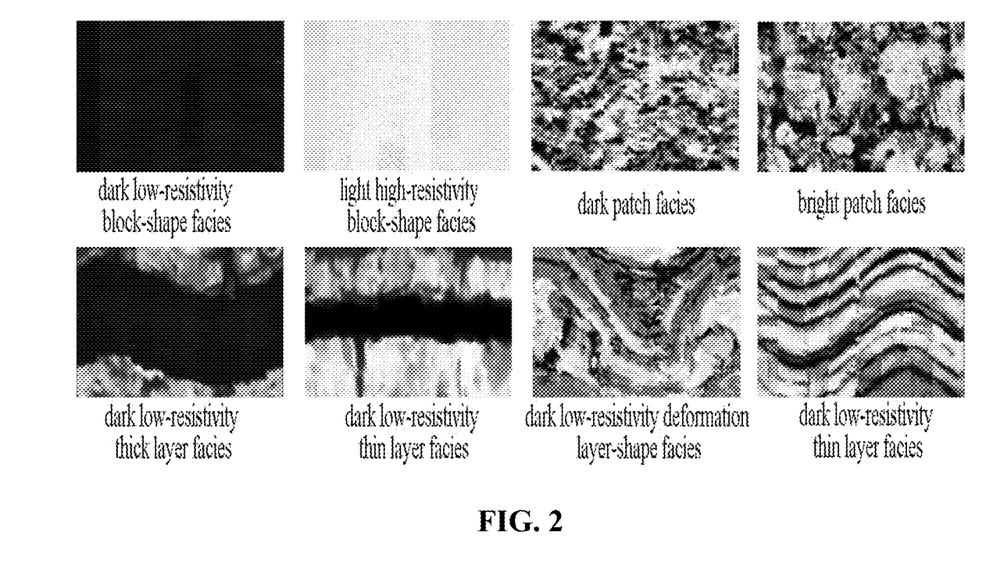
FIG. 2 is a schematic diagram of a sample of a full hole imaging well logging image corresponding to part of typical imaging well logging provided by embodiments of the invention.

FIG. 2 illustrates samples of full hole imaging well logging images corresponding to several types of typical imaging well logging. In the embodiment, by recognizing and classifying and intercepting the corresponding well logging facies of the imaging well logging images of more than 80 typical wells in Changqing oil field, Tarim oil field, Southwest oil and gas field and other oil fields, totally more than 14500 sample images of fifteen subfacies of the above described three main well logging facies are established, as a set of samples for subsequent deep learning model training. Using a script file that comes with the caffe framework, LevelDB data are generated of images of all categories of imaging well logging facies in the sample set and category labels of the well logging facies.

In the embodiment of the invention, in the step S104, a deep learning model is constructed according to the needs of the study, the deep learning model may include an N layer structure, and a specific numerical value of the N is determined according to the needs of the study. In the present invention, an optimum N, i.e. 17, is obtained after study. That is, the deep learning model includes a 17-layer structure in which a first layer is an input layer, second to sixth layers are hidden layers, and a seventeenth layer is an output layer, and each layer structure is as follows:

the first layer is an input layer, in which various imaging well logging facies sample images and category labels thereof that are obtained in the step S103 are input in the LevelDB data format;

the second layer is a hidden layer, including a convolution layer, and an activation function layer;

the third layer is a hidden layer, including a convolution layer, an activation function layer, and a pooling layer;

the fourth layer is a hidden layer, including a convolution layer and an activation function layer;

the fifth layer is a hidden layer, including a convolution layer and an activation function layer, a pooling layer;

the sixth layer is a hidden layer, including a convolution layer, and an activation function layer;

the seventh layer is a hidden layer, including a convolution layer, and an activation function layer;

the eighth layer is a hidden layer, including a convolution layer, an activation function layer, and a pooling layer;

the ninth layer is a hidden layer, including a convolution layer, and an activation function layer;

the tenth layer is a hidden layer, including a convolution layer, and an activation function layer;

the eleventh layer is a hidden layer, including a convolution layer, an activation function layer, and a pooling layer;

the twelfth layer is a hidden layer, including a convolution layer, and an activation function layer;

the thirteenth layer is a hidden layer, including a convolution layer, and an activation function layer;

the fourteenth layer is a hidden layer, including a convolution layer, an activation function layer, and a pooling layer;

the fifteenth layer is a hidden layer, including a full connection layer, an activation function layer and a Dropout layer;

the sixteenth layer is a hidden layer, including a full connection layer, an activation function layer and a Dropout layer; and the seventeenth layer is an output layer, including a full connection layer.

Specifically, the first layer is an input layer, in which the full hole image data and the corresponding well logging facies category label in a training set obtained in the step S103 are input in the LevelDB data format, and the batch size is set to 32, wherein setting of the batch size is related to a video memory of a computer, and different setting values of a video card size and a video memory size may vary, meanwhile vertical and horizontal scaling processes are performed on each input image, and the processed image has the same height and width, that is 224.

The second layer is a hidden layer, including a convolution layer and an activation function layer, wherein the convolution layer has totally 64 neurons, size of a convolution kernel is 3*3, the step size is set to 1, the convolution kernel and the input picture are subjected to a non-overlapping convolution operation, the edge extended value Padding is set to be 0, i.e., no edge extension is performed. The input data size is [32, 3, 224, 224], where 32 is the batch size, 3 is the number of image color channels, and [224, 224] are height and width of the input image respectively. The size of the output data after convolution operation is [32, 64, 224, 224], where 32 is the batch size, 64 is number of the channels (the number of the neurons is the same with the number of channel feature maps, after passing through 64 neurons, 64 channel feature maps are generated), [224, 224] are height and width of the feature maps respectively. The feature map obtained by the convolution layer is then processed by the activation function layer, wherein a non-linear activation function, i.e., a Relu function is selected as the activation function, and the calculation formula is max (0,x). The Relu function can reduce calculation amount of an error gradient in backpropagation, and meanwhile can increase sparse lines of the network, reduce interdependence of the parameters, and alleviate occurrence of the over-fitting problem. The activation function layer does not change either the size of the feature maps or the number of the feature maps.

The third layer is a hidden layer, including a convolution layer, an activation function layer, and a pooling layer, wherein the convolution layer has totally 64 neurons, the convolution kernel size is 3*3, the step size is set to 1, and the edge extended value Padding is 1. The data with the size of [32, 64, 224, 224] is output, after convolution processing. The output feature map is subject to pooling operation after being processed by a nonlinear activation function, i.e., the Relu function. The size of a pooling window is 2*2, and the pooling step size is 2. Maximum pooling without overlapping is performed on the picture. The pooling operation changes only size of the feature map, but does not change number of the feature maps. The output data of the pooling layer has a size [32, 64, 112, 112].

The fourth layer is a hidden layer, including a convolution layer and an activation function layer, wherein the convolution layer has totally 128 neurons, size of a convolution kernel is 3*3, the step size is set to 1, the edge extended value Padding is 1. The data with the size of [32, 128, 112, 112] is output after convolution processing, and the output feature map is processed by the Relu function.

The fifth layer is a hidden layer, including a convolution layer, an activation function layer, and a pooling layer, wherein the convolution layer has totally 64 neurons, the convolution kernel size is 3*3, the step size is set to 1, and the edge extended value Padding is 1. The data with the size of [32, 128, 112, 112] is output, after convolution processing. The output feature map is subject to activation processing by a nonlinear activation function, i.e., the Relu function, and then passes through the pooling layer, i.e., a downsampling layer. The size of a pooling window is 2*2, and the pooling step size is 2. Maximum pooling without overlapping is performed on the picture, to finally output an image having the data size of [32, 128, 56, 56].

The sixth layer is a hidden layer, including a convolution layer and an activation function layer, wherein the convolution layer has totally 128 neurons, size of a convolution kernel is 3*3, the step size is set to 1, the edge extended value Padding is 1. The data with the size of [32, 256, 56, 56] is output after convolution processing, and the output feature map is subject to activation processing by a nonlinear activation function, i.e., the Relu function.

The seventh layer is a hidden layer, including a convolution layer and an activation function layer, wherein the convolution layer has totally 128 neurons, size of a convolution kernel is 3*3, the step size is set to 1, the edge extended value Padding is 1. The data with the size of [32, 256, 56, 56] is output after convolution processing, and the output feature map is subject to activation processing by a nonlinear activation function, i.e., the Relu function.

The eighth layer is a hidden layer, including a convolution layer, an activation function layer, and a pooling layer, wherein the convolution layer has totally 256 neurons, the convolution kernel size is 3*3, the step size is set to 1, and the edge extended value Padding is 1. The data with the size of [32, 256, 56, 56] is output, after convolution processing. The output feature map is subject to activation processing by a nonlinear activation function, i.e., the Relu function, and then to maximum pooling operation by the pooling layer. The size of a pooling window is 3*3, and the pooling step size is 2. The output image has data size of [32, 256, 28, 28].

The ninth layer is a hidden layer, including a convolution layer and an activation function layer, wherein the convolution layer has totally 128 neurons, size of a convolution kernel is 3*3, the step size is set to 1, the edge extended value Padding is 1. The data with the size of [32, 512, 28, 28] is output after convolution processing, and the output feature map is subject to activation processing by a nonlinear activation function, i.e., the Relu function.

The tenth layer is a hidden layer, including a convolution layer and an activation function layer, wherein the convolution layer has totally 128 neurons, size of a convolution kernel is 3*3, the step size is set to 1, the edge extended value Padding is 1. The data with the size of [32, 512, 28, 28] is output after convolution processing, and the output feature map is subject to activation processing by a nonlinear activation function, i.e., the Relu function.

The eleventh layer is a hidden layer, including a convolution layer, an activation function layer, and a pooling layer, wherein the convolution layer has totally 256 neurons, the convolution kernel size is 3*3, the step size is set to 1, and the edge extended value Padding is 1. The data with the size of [32, 512, 28, 28] is output, after convolution processing. The output feature map is subject to activation processing by a nonlinear activation function, i.e., the Relu function, and then to maximum pooling operation by the pooling layer. The size of a pooling window is 2*2, and the pooling step size is 2. The output image has data size of [32, 512, 14, 14].

The twelfth layer is a hidden layer, including a convolution layer and an activation function layer, wherein the convolution layer has totally 128 neurons, size of a convolution kernel is 3*3, the step size is set to 1, the edge extended value Padding is 1. The data with the size of [32, 512, 14, 14] is output after convolution processing, and the output feature map is subject to activation processing by a nonlinear activation function, i.e., the Relu function.

The thirteenth layer is a hidden layer, including a convolution layer and an activation function layer, wherein the convolution layer has totally 128 neurons, size of a convolution kernel is 3*3, the step size is set to 1, the edge extended value Padding is 1. The data with the size of [32, 512, 14, 14] is output after convolution processing, and the output feature map is subject to activation processing by a nonlinear activation function, i.e., the Relu function.

The fourteenth layer is a hidden layer, including a convolution layer, an activation function layer, and a pooling layer, wherein the convolution layer has totally 256 neurons, the convolution kernel size is 3*3, the step size is set to 1, and the edge extended value Padding is 1. The data with the size of [32, 512, 14, 14] is output, after convolution processing. The output feature map is subject to activation processing by a nonlinear activation function, i.e., the Relu function, and then to maximum pooling operation by the pooling layer. The size of a pooling window is 2*2, and the pooling step size is 2. The output image has data size of [32, 512, 7, 7].

The fifteenth layer is a hidden layer, including a full connection layer, an activation function layer and a Dropout layer, wherein the full connection layer has totally 4096 neurons. The data with the size of [32, 4096] is output after processing of the full connection layer. The output feature map is subject to Dropout operation after being processed by a nonlinear activation function, i.e., the Relu function. The probability of dropping data is set to be 0.5. The Dropout layer is set mainly for preventing occurrence of over-fitting phenomenon. In the Dropout layer, the input data size is [32, 4096], and the output data size is [32, 4096].

The sixteenth layer is a hidden layer, including a full connection layer, an activation function layer and a Dropout layer, wherein the full connection layer has totally 4096 neurons. The data with the size of [32, 4096] is output after processing of the full connection layer. The output feature map is subject to Dropout operation after being processed by a nonlinear activation function, i.e., the Relu function. The probability of dropping data is set to be 0.5. The Dropout layer is set mainly for preventing occurrence of over-fitting phenomenon. In the Dropout layer, the input data size is [32, 4096], and the output data size is [32, 4096].

The seventeenth layer is an output layer, including only one full connection layer, having totally 15 neurons. The input data has the size of [32, 4096], and the output data has the size of [32, 15]. The probability of distinguishing each type of well logging facies is recorded in the output data, based on which the images are classified and the well logging facies categories are given.

In the hidden layer, through multiple convolution and pooling operations, the obtained image is smaller and smaller, the resolution ratio is lower and lower, and a heat map reflecting high-dimensional characteristics of the image is obtained. Then images are classified by the full connection layer and the well logging facies categories are given.

In the embodiment of the invention, in the step S105, the deep learning model established in the step S104 is trained using the training samples of the obtained various imaging well logging phases marked in the step S103. In the training process, a training sample image and a corresponding well logging facies category label are input in a LevelDB data format, and the predicted categories of the trained images are output. For difference between the predicted categories of the images and real categories of the samples, the parameter λ (including a weight parameter and an offset parameter) in the network, and preferably a model parameter, is adjusted by reverse gradient propagation. The specific training process includes:

1) initializing all weight and offset items in the deep learning model by a transfer learning method;

2) Neural network forward operation: based on the initialized weight parameters and offset parameters, inputting the training sample into a convolution neural network by an input unit to calculate net input and output of each unit of the hidden layer and the output layer, the output of the output layer is the predicted category of the imaging well logging facies;

Each unit of the hidden layer and the output layer has many inputs connected to the outputs of the neurons of the previous layer, each having a weight. The net input of each neuron in the hidden layer and the output layer is obtained by multiplying each input connected to the neuron by its corresponding weight and then summing; the activation function is applied to the net input of each neuron in the hidden layer or the output layer, to obtain the output of the neuron. For each neuron of the hidden layer, up to the output layer, an output value is calculated to obtain a network prediction value.

3) Neural network backward operation: calculating an error between the predicted imaging well logging facies category and the imaging well logging facies category to which the training sample belongs, and if the error is within a preset error range, the initialized weight parameter and offset parameter are optimal model parameters, and the deep learning model based on the initialized weight parameter and offset parameter is a trained deep learning model.

If the error is not within the preset error range, the initialized weight parameter and offset parameter are iteratively optimized by a reverse gradient propagation method (continuously iterating the forward operation and the backward operation of the above process), and the iteration is ended until the error is within the preset error range. The weight parameter and the offset parameter obtained by the last iteration are optimal model parameters.

Specifically, the error is calculated by a Delta learning rule, an iterative learning rate lr is involved in calculating the error, a step uniformly stepping strategy is adopted to calculate each iterative learning rate lr:

$$lr = \text{base\_lr} \times \text{gamma}^{floor(\frac{iter}{stepsize})};$$

wherein, lr is a learning rate of each iteration; base_lr is an initial learning rate, which can be adjusted according to the size of a data set; gamma is a change rate of the learning rate; stepsize is size of the stepping; iter is number of iterative steps; floor function expresses downward rounding.

Specifically, in addition to determining that the error is within the preset error range, it is also possible to determine whether or not mean-square distance between the predicted imaging well logging facies category and the imaging well logging facies category to which the training sample belongs is minimum, and to determine that the initialized weight parameter and offset parameter are optimal model parameters if the mean-square distance is minimum.

In the embodiment of the present invention, in the step S106, the electrical imaging well logging image of the well section to be recognized is subject to acceleration correction processing and equalization processing, resistivity scale processing, and a full hole image generation process (various processing described in the step S102), to generate an electrical imaging well logging image covering the full hole that is to be recognized, and then to perform depth window-by-depth window processing on the image (the depth range is generally 0.25 m, at this time, the size of the image is the same as that of the training sample image), and the depth window images are input into the deep learning model trained in the step S105, to obtain the predicted categories of the images, i.e., a result of categories of the well logging facies to which the images belong. After the depth window-by-depth window processing is completed, the categories of continuous imaging well logging facies of the well section can be obtained.

Figure 3:
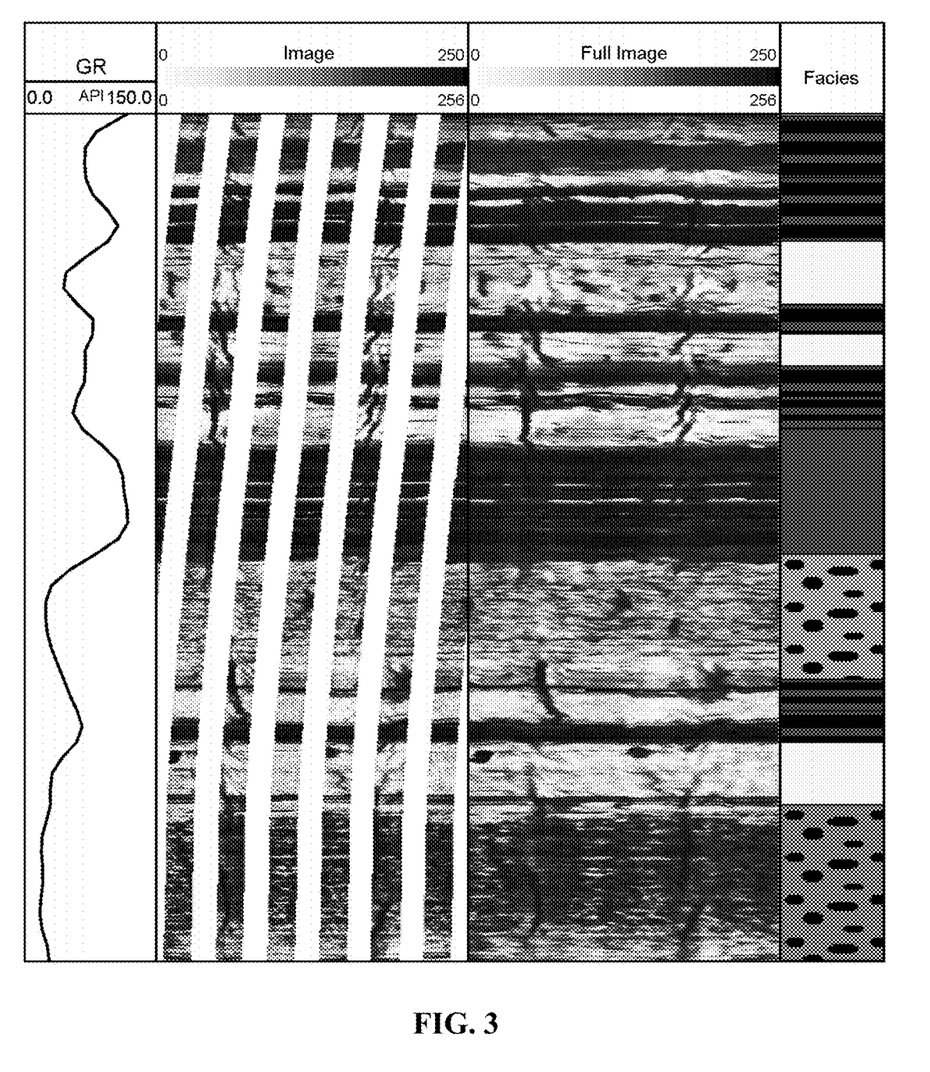
FIG. 3 is a schematic diagram of a recognition result of the electrical imaging well logging facies provided by embodiments of the invention.

FIG. 3 is a schematic diagram of a recognition effect of an electrical imaging well logging facies of a certain well section, in which the first line is a conventional gamma curve, the second line is an electrical imaging well logging image after the resistivity scale, the third line is a full hole imaging well logging image, and the fourth line is a result of automatic recognition of the electrical imaging well logging facies based on deep learning. It can be seen from the drawing that the method of the invention can effectively recognize categories of the imaging well logging facies of the sections, thereby reservoir distribution rule may be better studied and predicted.

Embodiments of the present invention also provide a computer device, which may be a desktop computer, a tablet computer and a mobile terminal, and etc., and the present embodiment is not limited thereto. In the embodiment, the computer device can refer to implementation of the method and the apparatus for automatically recognizing an electrical imaging well logging facies, and the contents thereof are incorporated herein, with repetitions being not described.

Figure 4:
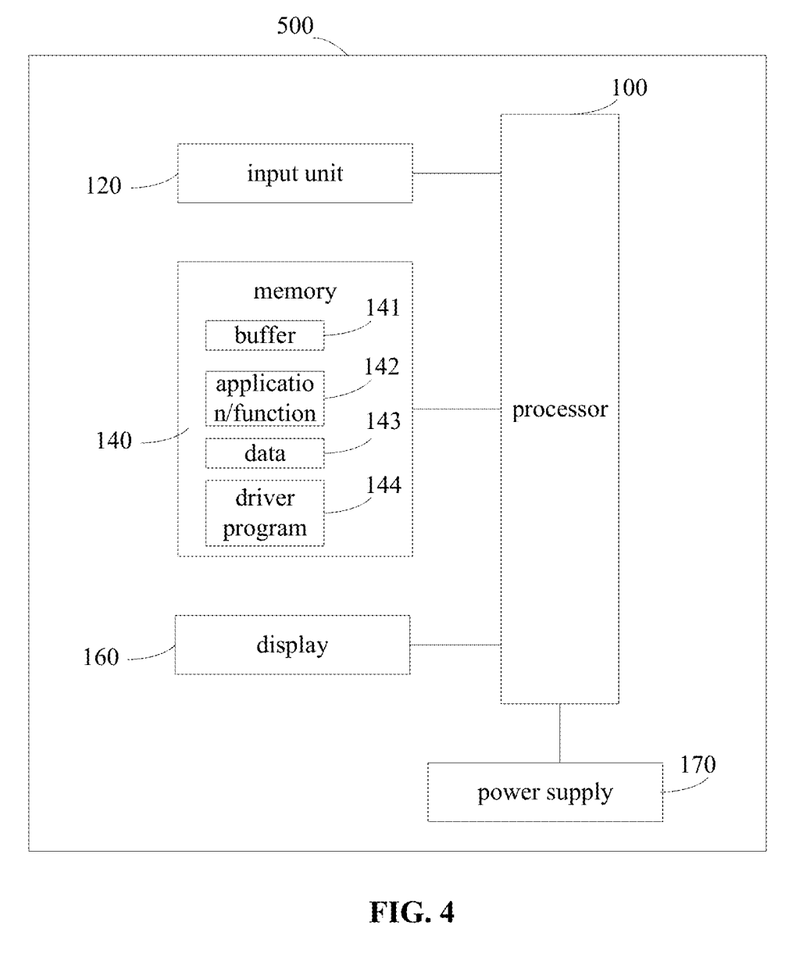
FIG. 4 is a schematic block diagram of a system composition of a computer device provided by embodiments of the invention.

FIG. 4 is a schematic block diagram of a system composition of a computer device 500 according to an embodiment of the present invention. As shown in FIG. 4, the computer device 500 may include a processor 100 and a memory 140, wherein the memory 140 is coupled to the processor 100. It is worth noting that this figure is exemplary; other types of structures may also be used in addition to or instead of the structure to implement telecommunications functions or other functions.

In one embodiment, an automatic recognition function of the electrical imaging well logging facies may be integrated into the processor 100. Wherein the processor 100 may be configured to perform control of acquiring historical data of electrical imaging well logging; pre-processing the historical data of the electrical imaging well logging to generate an electrical imaging well logging image covering a full hole; recognizing a typical imaging well logging facies in the electrical imaging well logging image covering the full hole, and determining the electrical imaging well logging image covering the full hole as a training sample in accordance with a category of the imaging well logging facies; constructing a deep learning model including an input layer, a plurality of hidden layers, and an output layer; training the deep learning model using the training sample to obtain a trained deep learning model; and recognizing the well logging facies of the electrical imaging well logging image of the well section to be recognized using the trained deep learning model.

Wherein, pre-processing the historical data of the electrical imaging well logging to generate an electrical imaging well logging image covering the full hole includes:

performing acceleration correction processing and equalization processing on the historical data of the electrical imaging well logging to obtain an original electrical imaging well logging image;

performing resistivity scale processing on the original electrical imaging well logging image to obtain a scale image reflecting resistivity of rocks of borehole wall formation; and performing full hole image generation processing on the scale image reflecting resistivity of rocks of borehole wall formation, to generate an electrical imaging well logging image covering the full hole.

Wherein the deep learning model is constructed as follows:

the deep learning model includes a 17-layer structure in which a first layer is an input layer, second to sixteenth layers are hidden layers, and a seventeenth layer is an output layer;

the structure of each layer is as follows:

the first layer is an input layer;

the second layer is a hidden layer, including a convolution layer, and an activation function layer;

the third layer is a hidden layer, including a convolution layer, an activation function layer, and a pooling layer;

the fourth layer is a hidden layer, including a convolution layer and an activation function layer;

the fifth layer is a hidden layer, including a convolution layer and an activation function layer, a pooling layer;

the sixth layer is a hidden layer, including a convolution layer, and an activation function layer;

the seventh layer is a hidden layer, including a convolution layer, and an activation function layer;

the eighth layer is a hidden layer, including a convolution layer, an activation function layer, and a pooling layer;

the ninth layer is a hidden layer, including a convolution layer, and an activation function layer;

the tenth layer is a hidden layer, including a convolution layer, and an activation function layer;

the eleventh layer is a hidden layer, including a convolution layer, an activation function layer, and a pooling layer;

the twelfth layer is a hidden layer, including a convolution layer, and an activation function layer;

the thirteenth layer is a hidden layer, including a convolution layer, and an activation function layer;

the fourteenth layer is a hidden layer, including a convolution layer, an activation function layer, and a pooling layer;

the fifteenth layer is a hidden layer, including a full connection layer, an activation function layer and a Dropout layer;

the sixteenth layer is a hidden layer, including a full connection layer, an activation function layer and a Dropout layer; and the seventeenth layer is an output layer, including a full connection layer.

Wherein, recognizing the well logging facies of the electrical imaging well logging image of the well section to be recognized using the trained deep learning model includes:

performing acceleration correction processing and equalization processing, resistivity scale processing, and a full hole image generation processing on the electrical imaging well logging image of the well section to be recognized, to generate an electrical imaging well logging image covering the full hole that is to be recognized;

performing depth window-by-depth window processing on the electrical imaging well logging image covering the full hole that is to be recognized, to obtain a plurality of depth window images; and inputting the plurality of depth window images into the trained deep learning model to obtain a recognition result.

In another embodiment, the apparatus for automatically recognizing an electrical imaging well logging facies may be configured separately from the processor 100, for example, the apparatus for automatically recognizing the electrical imaging well logging facies may be configured as a chip connected to the processor 100, by control of which a function of automatically recognizing the electrical imaging well logging facies is realized.

As shown in FIG. 4, the computer device 500 may further include an input unit 120, a display 160, and a power supply 170. It is worth noting that the computer device 500 does not either necessarily include all of the components shown in FIG. 4; in addition, the computer device 500 may also include components not shown in FIG. 4, with reference to the prior art.

Among other things, the processor 100, sometimes referred to as a controller or an operational control, may include a microprocessor or other processor apparatuses and/or logic apparatuses, the processor 100 receives inputs and controls operation of the components of the computer device 500.

The input unit 120 provides an input to the processor 100. The input unit 120 is, for example, a key or a touch input apparatus.

The memory 140 may be, for example, one or more of a buffer, a flash memory, a hard drive, a removable medium, a volatile memory, a non-volatile memory, or other suitable apparatuses. The above-described failure-related information may be stored, and in addition, a program for executing the relevant information may be stored. And the central processor 100 may execute the program stored in the memory 140 to implement information storage or processing and the like.

The memory 140 may be a solid-state memory such as read only memory (ROM), random access memory (RAM), SIM card, or the like. The memory may also be such a memory that it saves information even when power is off, on which data can be selectively erased and more data is set, and an example of which is sometimes referred to as an EPROM or the like. The memory 140 may also be some other types of apparatuses. The memory 140 includes a buffer memory 141 (sometimes referred to as a buffer). The memory 140 may include an application/function storage unit 142 for storing application programs and function programs or a flow for performing operation of an electronic device 600 by the processor 100.

The memory 140 may also include a data storage unit 143 for storing data, such as contacts, digital data, pictures, sounds, and/or any other data used by the electronic device. A driver program storage unit 144 of the memory 140 may include various driver programs of the electronic device for communication functions and/or for executing other functions of the electronic device, such as a messaging application, an address book application, and the like.

The display 160 is used for displaying objects to be displayed, such as images and text, and the like. The display may be, for example, an LCD display, but is not limited thereto.

The power supply 170 is used to provide power to the computer device 500.

Embodiments of the present invention also provide a computer-readable storage medium which stores a computer program that executes the above-described method for automatically recognizing an electrical imaging well logging facies. The computer-readable storage medium may include physical means for storing information, and the physical means may digitize and then stores information by a medium using electrical, magnetic or optical means. The computer-readable storage medium according to the present embodiment may include an apparatus for storing information in an electric energy manner, e.g., various types of memories such as RAM, ROM, and the like; an apparatus for storing information by means of magnetic energy, such as a hard disk, a floppy disk, a magnetic tape, a magnetic core memory, a bubble memory, a U disk; an apparatus for storing information optically, such as a CD or a DVD. Of course, there are other ways of readable storage media, such as a quantum memory, a graphene memory, and the like.

In summary, the method and the apparatus for automatically recognizing an electrical imaging well logging facies provided by the present invention have the following advantages:

1) the concept of deep learning is introduced into electrical imaging well logging facies automation, thereby realizing intelligent recognition and analysis of different types of well logging facies, and effectively improving recognition accuracy;

2) through automatic analysis and prediction of intrinsic attributes of various imaging well logging facies by a deep learning method, the disadvantage of the prior art depending on geological feature extraction effect and the statistical feature parameter index types is avoided, and accuracy of recognition is improved;

3) automatic recognition based on a large number of typical well logging facies samples has a wide range of applicability, meanwhile reduces influences of many human factors, and achieves a high degree of automation.

Persons skilled in the art shall understand that, embodiments of the present invention can be provided as a method, a system or a computer program product. Therefore, the present invention can adopt the forms of a full hardware example, a full software example, or combination of a software example and a hardware example. Moreover, the present invention can adopt the form of a computer program product that is implemented on one or more computer-usable storage medium (including but not limited to a disk memory, a CD-ROM, an optical memory, and etc.) including computer-usable program codes.

The invention is described with reference to flow diagrams and/or block diagrams of the method, the device (system) and the computer program product according to the embodiment of the invention. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program commands can also be stored in a computer-readable memory that can guide a computer or other programmable data processing device to operate in a special way, so that the command stored in the computer-readable memory generates a manufactured product including a command device which achieves functions designated in one or more flows in the flow diagrams and/or one or more blocks in the block diagrams.

These computer program commands can also be loaded on a computer or other programmable data processing device, on which a series of operation steps are executed to generate processing achieved by the computer, so that the command executed on the computer or other programmable data processing device is provided for being used in the steps of achieving functions designated in one or more flows in the flow diagrams and/or one or more blocks in the block diagrams.

The foregoing is merely a preferred embodiment of the present invention and is not intended to limit the present invention, and various modifications and variations can be made to the embodiment of the present invention by those skilled in the art. Any modifications, equivalents, improvements, etc. made within the spirit and principle of the present invention are intended to be included within the protection scope of the present invention.

The invention claimed is:

1. A method for automatically recognizing an electrical imaging well logging facies comprising:
acquiring historical data of electrical imaging well logging;
pre-processing the historical data of the electrical imaging well logging to generate an electrical imaging well logging image covering a full hole;
recognizing a typical imaging well logging facies in the electrical imaging well logging image covering the full hole, and determining the electrical imaging well logging image covering the full hole as a training sample in accordance with a category of the imaging well logging facies;

constructing a deep learning model including an input layer, a plurality of hidden layers, and an output layer;

training the deep learning model using the training sample to obtain a trained deep learning model;

acquiring the electrical imaging well logging image of a well section; and using the trained deep learning model, the electrical imaging well logging image of the well section to be identified is used for logging facies recognition;

the deep learning model is constructed as follows:

the deep learning model includes a seventeen-layer structure comprising: a first layer, a second layer, a third layer, a fourth layer, a fifth layer, a sixth layer, a seventh layer, an eighth layer, a ninth layer, a tenth layer, an eleventh layer, a twelfth layer, a thirteenth layer, a fourteenth layer, a fifteenth layer, a sixteenth layer, and a seventeenth layer;

a structure of each layer of the seventeen-layer structure is as follows:

the first layer is an input layer;

the second layer is a hidden layer, including a convolution layer, and an activation function layer;

the third layer is a hidden layer, including a convolution layer, an activation function layer, and a cooling layer;

the fourth layer is a hidden layer, including a convolution layer and an activation function layer;

the fifth layer is a hidden layer, including a convolution layer and an activation function layer, and a pooling layer;

the sixth layer is a hidden layer, including a convolution layer, and an activation function layer;

the seventh layer is a hidden layer, including a convolution layer, and an activation function layer;

the eighth layer is a hidden layer, including a convolution layer, an activation function layer, and a pooling layer;

the ninth layer is a hidden layer, including a convolution layer, and an activation function layer;

the tenth layer is a hidden layer, including a convolution layer, and an activation function layer;

the eleventh layer is a hidden layer, including a convolution layer, an activation function layer, and a pooling layer;

the twelfth layer is a hidden layer, including a convolution layer, and an activation function layer;

the thirteenth layer is a hidden layer, including a convolution layer, and an activation function layer;

the fourteenth layer is a hidden layer, including a convolution layer, an activation function layer, and a pooling layer;

the fifteenth layer is a hidden layer, including a full connection layer, an activation function layer and a Dropout layer;

the sixteenth layer is a hidden layer, including a full connection layer an activation function layer and a Dropout layer; and the seventeenth layer is an output layer, including a full connection layer.

2. The method for automatically recognizing an electrical imaging well logging facies according to claim 1, wherein pre-processing the historical data of the electrical imaging well logging to generate an electrical imaging well logging image covering the full hole includes:

performing acceleration correction processing and equalization processing on the historical data of the electrical imaging well logging to obtain an original electrical imaging weln logging image;

performing resistivity scale processing on the original electrical imaging well logging image to obtain a scale image reflecting resistivity of rocks of borehole wall formation; and performing full hole image generation processing on the scale image reflecting resistivity of rocks of borehole wall formation, to generate an electrical imaging well logging image covering the full hole.

3. The method for automatically recognizing an electrical imaging well logging facies according to claim 2, wherein using the trained deep learning model, the electrical imaging well logging image of the well section to be identified is used for logging facies recognition includes:

performing acceleration correction processing and equalization processing, resistivity scale processing, and a full hole image generation processing on the electrical imaging well logging image of the well section to be recognized, to generate an electrical imaging well logging image covering the full hole that is to be recognized;

performing depth window-by-depth window processing on the electrical imaging well logging image covering the full hole that is to be recognized, to obtain a plurality of depth window images; and inputting the plurality of depth window images into the trained deep learning model to obtain a recognition result.

4. A computer device comprising:

a memory, a processor, and a computer program stored on the memory and executable on the processor, wherein when executing the computer program, the processor implementing the following:

acquiring historical data of electrical imaging well logging;

pre-processing the historical data of the electrical imaging well logging to generate an electrical imaging well logging image covering a full hole;

recognizing a typical imaging well logging facies in the electrical imaging well logging image covering the full hole, and determining the electrical imaging well logging image covering the full hole as a training sample in accordance with a category of the imaging well logging facies;

constructing a deep learning model including an input layer, a plurality of hidden layers, and an output layer;

training the deep learning model using the training sample to obtain a trained deep learning model;

acquiring the electrical imaging well logging image of a well section; and using the trained deep learning model, the electrical imaging well logging image of the well section to be identified is used for logging facies recognition; and the deep learning model is constructed as follows:

the deep learning model includes a seventeen-layer structure comprising: a first layer, a second layer, a third layer, a fourth layer, a fifth layer, a sixth layer, a seventh layer, an eighth layer, a ninth layer, a tenth layer, an eleventh layer, a twelfth layer, a thirteenth layer, a fourteenth layer, a fifteenth layer, a sixteenth layer, and a seventeenth layer;

a structure of each layer of the seventeen-layer structure is as follows:
the first layer is an input layer;
the second layer is a hidden layer, including a convolution layer, and an activation function layer;
the third layer is a hidden layer, including a convolution layer, an activation function layer, and a pooling layer;
the fourth layer is a hidden layer, including a convolution layer and an activation function layer;
the fifth layer is a hidden layer, including a convolution layer and an activation function layer, and a pooling layer;
the sixth layer is a hidden layer, including a convolution layer, and an activation function layer;
the seventh layer is a hidden layer, including a convolution layer, and an activation function layer;
the eighth layer is a hidden layer, including a convolution layer, an activation function layer, and a cooling layer;
the ninth layer is a hidden layer, including a convolution layer, and an activation function layer;
the tenth layer is a hidden layer, including a convolution layer, and an activation function layer;
the eleventh layer is a hidden layer, including a convolution layer, an activation function layer, and a pooling layer;
the twelfth layer is a hidden layer, including a convolution layer, and an activation function layer;
the thirteenth layer is a hidden layer, including a convolution layer, and an activation function layer;
the fourteenth layer is a hidden layer, including a convolution layer, an activation function layer, and a pooling layer;
the fifteenth layer is a hidden layer, including a full connection layer, an activation function layer and a Dropout layer;
the sixteenth layer is a hidden layer, including a full connection layer, an activation function layer and a Dropout layer; and
the seventeenth layer is an output layer, including a full connection layer.

5. The computer device according to claim 4, wherein when executing the computer program, the processor implementing the following:
to generate the electrical imaging well logging image covering the full hole, pre-processing the historical data of the electrical imaging well logging by:
performing acceleration correction processing and equalization processing on the historical data of the electrical imaging well logging to obtain an original electrical imaging well logging image;
performing resistivity scale processing on the original electrical imaging well logging image to obtain a scale image reflecting resistivity of rocks of borehole wall formation; and
performing full hole image generation processing on the scale image reflecting resistivity of rocks of borehole wall formation, to generate an electrical imaging well logging image covering the full hole.

6. The computer device according to claim 5, wherein when executing the computer program, the processor implementing the following:

using the trained deep learning model, the electrical imaging well logging image of the well section to be identified is used for logging facie recognition, by:
performing acceleration correction processing and equalization processing, resistivity scale processing, and a full hole image generation processing on the electrical imaging well logging image of the well section to be recognized, to generate an electrical imaging well logging image covering the full hole that is to be recognized;
performing depth window-by-depth window processing on the electrical imaging well logging image covering the full hole that is to be recognized, to obtain a plurality of depth window images; and
inputting the plurality of depth window images into the trained deep learning model to obtain a recognition result.

7. A non-transitory computer-readable medium, wherein the non-transitory computer-readable medium stores a computer program for executing the following method of:
acquiring historical data of electrical imaging well logging;
pw-processing the historical data of the electrical imaging well logging to generate an electrical imaging well logging image covering a full hole;
recognizing a typical imaging well logging facies in the electrical imaging well logging image covering the full hole, and determining the electrical imaging well logging image covering the full hole as a training sample in accordance with a category of the imaging well logging facies;
constructing a deep learning model including an input layer, a plurality of hidden layers, and an output layer;
training the deep learning model using the training sample to obtain a trained deep learning model;
acquiring the electrical imaging well logging image of a well section; and
using the trained deep learning model, the electrical imaging well logging image of the well section to be identified is used for logging facies recognition;
the computer program is used for executing the following:
the deep learning model is constructed as follows:
the deep learning model includes a seventeen-layer structure comprising: a first layer, a second layer, a third layer, a fourth layer, a fifth layer, a sixth layer, a seventh layer, an eighth layer, a ninth layer, a tenth layer, an eleventh layer, a twelfth layer, a thirteenth layer, a fourteenth layer, a fifteenth layer, a sixteenth layer, and a seventeenth layer;
a structure of each layer of the seventeen-layer structure is as follows:
the first layer is an input layer;
the second layer is a hidden layer, including a convolution layer, and an activation function layer;
the third layer is a hidden layer, including a convolution layer, an activation function layer, and a pooling layer;
the fourth layer is a hidden layer, including a convolution layer and an activation function layer;
the fifth layer is a hidden layer, including a convolution layer and an activation function layer, and a pooling layer,
the sixth layer is a hidden layer, including a convolution layer, and an activation function layer;

the seventh layer is a hidden layer, including a convolution layer, and an activation function layer;

the eighth layer is a hidden layer, including a convolution layer, an activation function layer, and a pooling layer;

the ninth layer is a hidden layer, including a convolution layer, and an activation function layer;

the tenth layer is a hidden layer, including a convolution layer, and an activation function layer;

the eleventh layer is a hidden layer, including a convolution layer, an activation function layer, and a pooling layer;

the twelfth layer is a hidden layer, including a convolution layer, and an activation function layer;

the thirteenth layer is a hidden layer, including a convolution layer, and an activation function layer;

the fourteenth layer is a hidden layer, including a convolution layer, an activation function layer, and a pooling layer;

the fifteenth layer is a hidden layer, including a full connection layer, an activation function layer and a Dropout layer;

the sixteenth layer is a hidden layer, including a full connection layer, an activation function layer and a Dropout layer; and the seventeenth layer is an output layer, including a full connection layer.

8. The non-transitory computer-readable medium according to claim 7, wherein the computer program is used for executing the following:

to generate the electrical imaging well logging image covering the full hole, pre-processing the historical data of the electrical imaging well logging by:

performing acceleration correction processing and equalization processing on the historical data of the electrical imaging well logging to obtain an original electrical imaging well logging image;

performing resistivity scale processing on the original electrical imaging well logging image to obtain a scale image reflecting resistivity of rocks of borehole wall formation; and performing full hole image generation processing on the scale image reflecting resistivity of rocks of borehole wall formation, to generate an electrical imaging well logging image covering the full hole.

9. The non-transitory computer-readable medium according to claim 8, wherein the computer program is used for executing the following:

using the trained deep learning model, the electrical imaging well logging image of the well section to be identified is used for logging facies recognition, by:

performing acceleration correction processing and equalization processing, resistivity scale processing, and full hole image generation processing on the electrical imaging well logging image of the well section to be recognized, to generate an electrical imaging well logging image covering the full hole that is to be recognized;

performing depth window-by-depth window processing on the electrical imaging well logging image covering the full hole that is to be recognized, to obtain a plurality of depth window images; and inputting the plurality of depth window images into the trained deep learning model to obtain a recognition result.

* * * * *